Patented Oct. 5, 1954

2,691,010

UNITED STATES PATENT OFFICE 2,691,010

AMIDE SYNTHESIS

George W. Anderson, Darien, Conn., assignor to American Cyanamid Company, New York, N. Y., a corporation of Maine No Drawing. Application July 10, 1951,
Serial No. 236,080

13 Claims. (Cl. 260—112)

This invention relates to a new method of preparing substituted amides and peptides.

Although there are many available methods for preparing substituted amides and peptides, none of these methods have proved satisfactory in all respects. The new method of this invention provides a simple procedure for preparing substituted amides and peptides which overcomes many of the difficulties of the prior art.

The new method of this invention broadly comprises reacting together a tetraalkylpyrophosphite, a carboxylic acid, and a member selected from the group consisting of amines having amine hydrogen and salts thereof with strong acids. The reaction may be more clearly illustrated by the following general equation:

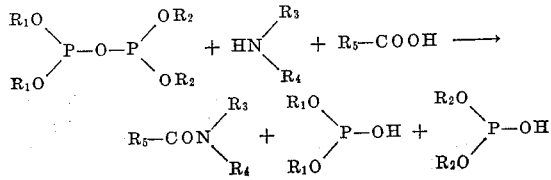

in which $R_1$ and $R_2$ represent the same or different lower alkyl radicals having less than 4 carbon atoms, $R_3$—NH—$R_4$ represents a primary or secondary amine, and $R_5$ represents hydrogen or a radical capable of being attached to the carbonyl group by a carbon to carbon linkage.

Tetraalkylpyrophosphites of the above formula may be prepared by reacting a dialkylhalophosphite with an alkali metal salt of a dialkylphosphite or more readily by the reaction of a dialkylhalophosphite with a dialkylphosphite in the presence of a tertiary amine as disclosed in copending U. S. application S. N. 231,264 filed June 12, 1951. Tetraalkylpyrophosphites of the above formula in which $R_1$ and $R_2$ represent ethyl groups are preferred although compounds in which $R_1$ and $R_2$ represent other lower alkyl radicals may also be satisfactorily employed.

Practically any primary or secondary amine having amine hydrogen is suitable for use in the new process of this invention and the particular amine employed depends upon the substituted amide desired. Amines which may suitably be employed in the new process may be illustrated by the following: primary aliphatic amines, for instance methylamine, ethylamine, propylamine, butylamine, hexylamine and allylamine; secondary aliphatic amines, for instance dimethylamine and dibutylamine; substituted aliphatic amines, for instance chloroethylamine, phenethylamine and benzylamine; aromatic amines, for instance aniline and naphthylamine; substituted aromatic amines, for instance m-toluidine and p-benzylaniline; secondary mixed aliphatic-aromatic amines, for instance N-allylaniline, and benzylaniline; cyclic amines, for instance piperidine, and morpholine; heterocyclic amines, for instance aminopyrimidine; diamines, for instance butylenediamine and ethylenediamine.

In place of the free amine, one may, if desired, employ addition salts of amines with strong acids although the results obtained are usually not quite so satisfactory. For instance, one may employ an amine hydrochloride in place of the free amine. If the process of this invention is performed with an amine addition salt, one may at some stage of the reaction add an acid acceptor such as a tertiary amine, although this is not necessary. Various modifications of this procedure are illustrated in the examples to follow.

Practically any monobasic or polybasic carboxylic acid is suitable for the process of this invention. The following specific examples may be given by way of illustration: aliphatic carboxylic acids such as acetic acid, propionic acid, butyric acid, caproic acid, stearic acid, oleic acid, and the like; substituted aliphatic acids such as mono-chloracetic acid, and the like, polybasic acids such as succinic acid, adipic acid, and the like; aromatic acids such as benzoic, naphthalic, and the like; heterocyclic acids such as nicotinic, thiophene carboxylic, and the like, alicyclic acids such as naphthenic; etc. When dibasic acids are employed in the process, either the monoamide or the diamide may be prepared depending upon the number of molar equivalents of amine used.

The order of reaction is inmaterial and the tetraalkylpyrophosphite may be reacted first with the carboxylic acid and this reaction product then reacted with an amine, the tetraalkylpyrophosphite may first be reacted with an amine and this reaction product then reacted with a carboxylic acid or the tetraalkylpyrophosphite may be reacted simultaneously with an amine and a carboxylic acid by mixing it with an amine salt. In fact the same compound may furnish both the amino group and the carboxy group although it will be obvious to those skilled in the art that under such conditions there will be a tendency for long chain polypeptide polymer formation.

The new procedure of this invention has many advantages. In the first place, the tetraalkylpyrophosphites are relatively stable compounds and are quite convenient to work with. Also, the process of this invention results in very high yields, in some instances above 90% of theoretical.

The reaction product is obtained in relatively pure form and in most instances is quite readily separated from the reaction mixture. The new process of this invention is one of the most versatile yet discovered and is operable with an exceptionally wide variety of amines and carboxylic acids. In fact, by the new method of this invention it is possible to prepare an almost unlimited number of complex polypeptide compounds.

The new procedure of this invention is especially applicable to the preparation of amides and peptides from the naturally occurring aminoacids. In the preparation of such compounds a given aminoacid may be substituted at either the amino group or the carboxyl group by blocking one or the other of the two groups, as may be illustrated by the following equations:

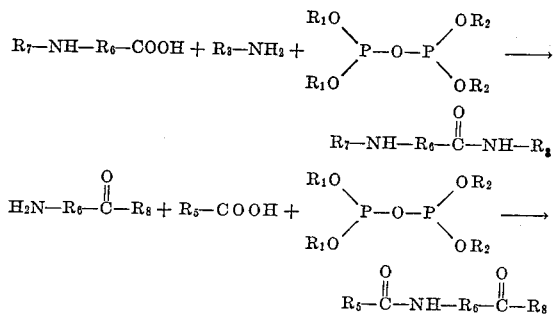

in which $R_1$, $R_2$, $R_4$, and $R_5$ are as previously defined, $R_3-NH_2$ is a primary amine, $R_6$ is a residue of an aminoacid, $R_7$ is an acyl group and $R_8$ is a blocking group. In the above equation $R_6$ may conveniently represent the residue of a naturally occurring aminoacid such as may be illustrated by the following: alanine, valine, norvaline, leucine, norleucine, isoleucine, isovaline, phenylalanine, tyrosine, serine, cysteine, methionine, aspartic acid, glutamic acid, lysine, ornithine, asparagine, citrulline, histidine, tryptophane, proline, or other alpha-aminoacids having 1 to 12 carbon atoms. $R_6$ may also represent the residue of peptides formed from one or more of the above aminoacids, in which case the process of this invention will result in the formation of a higher peptide derivative.

A solvent or diluent may be employed in the new process of this invention, or if desired, the reaction may be performed in the complete absence of a solvent other than the dialkylphosphite formed as a by-product of the reaction. In fact if a solvent is employed, a dialkylphosphite such as diethylphosphite or dipropylphosphite is preferred for this purpose. Other solvents which may suitably be employed are aromatic hydrocarbons, for instance benzene and toluene, aliphatic hydrocarbons, for instance pentane, cyclic ethers, for instance dioxane chloride, hydrocarbons, for instance chloroform and chlorobenzene, and simple ethers, for instance ethyl ether. If the amine and the carboxylic acid are mixed together before reaction with the tetraalkylpyrophosphite, they form a salt which is relatively insoluble in most of the above solvents but this is not unduly detrimental since as the tetraalkylpyrophosphite reacts with the salt in solution, equilibrium is destroyed and further solution is obtained.

The reaction may be performed over a relatively wide range of temperatures, for instance from about 20° C. to 120° C. with temperatures in the range of 60° C. to 100° C. being preferred. Of course if one is working with labile compounds which are subject to decomposition at moderate temperatures, it is preferable to work with temperatures in the lower part of the operable range. The reaction is substantially complete in only a short time, for instance 5 to 15 minutes at higher reaction temperatures but at lower temperatures from 15 minutes to 2 hours should be allowed for complete reaction.

The reaction will be more particularly illustrated by the following specific examples in which all parts are by weight unless otherwise indicated.

EXAMPLE I

*Salicylanilide*

1.38 parts by weight of salicylic acid and .93 part by weight of aniline are mixed and to the mixture there is added 2.58 parts by weight of tetraethylpyrophosphite. An immediate exothermic reaction takes place with a resulting 10° C. rise in the temperature of the mixture. The mixture is heated on a steam bath at 95° C. for 20 minutes and then diluted with 10 parts by volume of water. The resulting precipitate is removed by filtration, cooled, and washed with 4 parts by volume of half saturated sodium bicarbonate solution and 2.44 parts by volume of water. This salicylanilide is then purified by recrystallization from 40 parts by volume of 50% alcohol to give a product having a melting point of about 134° C.–135° C.

In place of the tetraethylpyrophosphite in the above example one can substitute an equal molar quantity of tetramethylpyrophosphite or tetrapropylpyrophosphite with satisfactory results.

EXAMPLE II

*2-phenylcinchoninic acid anilide*

A mixture is formed of 2.5 parts by weight of 2-phenylcinchoninic acid and .93 part by weight of aniline and to this there is added 2.58 parts by weight of tetraethylpyrophosphite. An immediate exothermic reaction occurs with a resulting 10° C. rise in temperature. The mixture is heated on a steam bath to 95° C. and the heat of the resulting reaction is sufficient to raise the temperature of the reaction mixture to about 105° C. in about 10 minutes. After an additional 10 minutes the reaction mixture is diluted with 10 parts by volume of water, chilled, and 2 parts by volume of saturated sodium bicarbonate solution added. The precipitate is removed by filtration and washed with water. An additional crop of phenylcinchoninic acid anilide is obtained by evaporation of the filtrate. The two crops of phenylcinchoninic acid are purified by recrystallization from 95% alcohol in the presence of activated carbon.

EXAMPLE III

*N-methylacetanilide*

In 15 parts by volume of dried toluene there is dissolved 1.2 parts by weight of acetic acid and 2.14 parts by weight of N-methylaniline. To this solution there is added 5.68 parts by weight of tetraethylpyrophosphite and the resulting clear solution refluxed for 2 hours. The solid precipitate is removed by filtration and washed with 10 parts by volume of saturated sodium bicarbonate solution and 10 parts by volume of water. A second crop of crystals is obtained by evaporation of the filtrate. This N-methylacetanilide is purified by recrystallization from alcohol.

EXAMPLE IV

Acetanilide

To 15 parts by volume of dried toluene there is added 1.2 parts by weight of acetic acid, 1.96 parts by weight of aniline and 5.68 parts by weight of tetraethylpyrophosphite. The solution is refluxed two hours, cooled, and the toluene solvent removed by evaporation on a steam bath. The remaining solid is washed with 10 parts by volume of saturated sodium bicarbonate, 10 parts by volume of water and dried. The resulting acetanilide has a melting point of about 110° C. to 111° C.

The procedure of this example has resulted in yields of acetanilide as high as 97.3% of theoretical in such a pure state that a sample of the material mixed with an authentic sample of acetanilide resulted in no noticeable depression of the melting point of the pure material.

EXAMPLE V

Benzanilide

To 15 parts by volume of dried toluene there is added 1.22 parts by weight of benzoic acid, .93 part by weight of aniline and 2.84 parts by weight of tetraethylpyrophosphite. The resulting clear solution is refluxed for 2 hours and then cooled in an ice bath. The toluene solvent is removed by heating the mixture on a steam bath in a stream of air and the resulting solid is washed with 10 parts by volume of saturated sodium bicarbonate solution, 10 parts by volume of water and dried to give crystalline benzanilide.

EXAMPLE VI o-Chloroacetanilide

In 15 parts by volume of dried toluene there is dissolved 1.2 parts by weight of acetic acid followed by 2.55 parts by weight of o-chloroaniline and 5.68 parts by weight of tetraethylpyrophosphite. The solution is refluxed for 2 hours and then the toluene solvent is removed by evaporation on a steam bath. The remaining solid is washed with 10 parts by volume of saturated sodium bicarbonate solution, 10 parts by volume of water, and dried. This o-chloroacetanilide is purified by recrystallization from 20 parts by volume of ether.

EXAMPLE VII

Carbobenzoxy-beta-DL-phenylalanine anilide

In 15 parts by volume of toluene there is dissolved 2.99 parts by weight of carbobenzoxy-beta-DL-phenylalanine followed by 0.93 parts by weight of aniline and 2.84 parts by weight of tetraethylpyrophosphite. The resulting clear solution is refluxed for 2 hours, cooled in an ice bath and the solid precipitate removed by filtration. A second crop of carbobenzoxy-beta-DL-phenylalanine anilide is obtained by evaporation of the filtrate, washing the remaining solid with 10 parts by volume of saturated sodium bicarbonate solution and 10 parts by volume of water. In order for the second crop of crystals to have a melting point comparable to that of the first it must be recrystallized from about 20 parts by volume of absolute alcohol.

EXAMPLE VIII

Carbobenzoxyglycyl-DL-phenylalanine ethyl ester

Part A.—In 15 parts by volume of benzene there is dissolved 2.1 parts by weight of carbobenzoxyglycine and 1.9 parts by weight of phenylalanine ethyl ester followed by 2.58 parts by weight of tetraethylpyrophosphite. This mixture is refluxed for 15 minutes, cooled and washed with 10 parts by volume of saturated sodium bicarbonate, 5 parts by volume of water, 5 parts by volume of dilute hydrochloric acid and 5 parts by volume of water. The benzene solvent is removed by distillation and the residue dissolved in 10 parts by volume of absolute alcohol. This solution is diluted with 10 parts by volume of water and chilled to give crystalline carbobenzoxyglycyl-DL-phenylalanine ethyl ester.

Part B.—The procedure of Part A is repeated except that an equal molar quantity of phenylalanine ethyl ester hydrochloride and a molar equivalent of triethylamine is employed in place of the phenylalanine ethyl ester. The yield of carbobenzoxyglycyl-DL-phenylalanine ethyl ester is approximately the same.

Part C.—When the procedure described in Part A is repeated except that the 15 parts by volume of benzene solvent is dispensed with, a very sligthly higher yield is obtained.

EXAMPLE IX

Carbobenzoxydiglycylglycine ethyl ester 1.9 parts by weight of glycylglycine ethyl ester hydrochloride is dissolved in 10 parts by volume of diethylphosphite and the resulting solution treated with 1.1 parts by weight of triethylamine. The resulting precipitate of triethylamine hydrochloride is removed by filtration. The remaining solution of glycylglycine ethyl ester is treated with 2.1 parts by weight of carbobenzoxyglycine and 2.6 parts by weight of tetraethylpyrophosphite. This mixture is heated at 93° C. for 30 minutes, diluted with 24 parts by volume of water and chilled. The resulting precipitate of carbobenzoxydiglycylglycine ethyl ester is removed by filtration and purified by recrystallization from approximately 40 parts by volume of alcohol-water.

EXAMPLE X

Carbobenzoxy-L-tyrosylglycylglycine ethyl ester

Part A.—In 10 parts by volume of diethylphosphite there is dissolved 1.96 parts by weight of glycylglycine ethyl ester hydrochloride and this solution treated with 1.1 parts by weight of triethylamine. The precipitate of triethylamine hydrochloride is removed by filtration and the remaining solution of glycylglycine ethyl ester treated with 3.16 parts by weight of carbobenzoxy-L-tyrosine followed by 2.6 parts by weight of tetraethylpyrophosphite. This mixture is heated at 98° C. for 30 minutes and filtered. To the resulting solution there is added 45 parts by volume of water, the resulting precipitate removed and washed with 5 parts by volume of half saturated sodium bicarbonate solution and 5 parts by volume of water. This carbobenzoxy-L-tyrosylglycylglycine ethyl ester is then purified by recrystallization from approximately 40 parts by volume of alcohol-water.

Part B.—The procedure of Part A is repeated except that the precipitate of triethylamine hydrochloride is not removed until after heating and 6.4 parts by weight of tetraethylpyrophosphite are employed. The yield of carbobenzoxy-L-tyrosylglycylglycine ethyl ester is slightly higher.

Part C.—The procedure of Part B is repeated except that 5.16 parts by weight of tetraethylpyrophosphite and 2.94 parts by weight of glycylglycine ethyl ester hydrochloride are employed. The yield of carbobenzoxy-L-tyrosylglycylglycine ethyl ester is substantially the same as in Part A.

Part D.—1.96 parts by weight of glycylglycine ethyl ester hydrochloride and 3.16 parts by weight of carbobenzoxy-L-tyrosine are mixed and to this mixture there is added 6.45 parts by weight of tetraethylpyrophosphite. The resulting mixture is heated on a steam bath for 1¼ hours and the product separated and purified as in Part A. The yield of carbobenzoxy-L-tyrosylglycylglycine ethyl ester is substantially the same as in Part A but the product is slightly more difficult to crystallize.

Part E.—In 10 parts by volume of diethylphosphite there is dissolved 3.16 parts by weight of carbobenzoxy-L-tyrosine and 2.58 parts by weight of tetraethylpyrophosphite and the mixture heated to 98° C. To the hot mixture there is added 1.96 parts by weight of glycylglycine ethyl ester hydrochloride and 1.1 parts by weight of triethylamine and the mixture heated an additional 10 minutes and filtered. The carbobenzoxy-L-tyrosylglycylglycine ethyl ester is isolated and purified as in Part A but in slightly lower yield.

Part F.—In 10 parts by volume of diethylphosphite there is dissolved 1.96 parts by weight of glycylglycine ethyl ester hydrochloride, 1.1 parts by weight of triethylamine and 2.6 parts by weight of tetraethylpyrophosphite and the mixture heated to 98° C. To the hot reaction mixture there is added 3.16 parts of carbobenzoxy-L-tyrosine and this mixture heated an additional 10 minutes. The mixture is filtered to remove triethylamine hydrochloride and the carbobenzoxy-L-tyrosylglycylglycine ethyl ester isolated and purified as in Part A. The yield is somewhat lower.

EXAMPLE XI

Carbobenzoxyglycyl-DL-phenylalanine ethyl ester

Part A.—2.1 parts by weight of carbobenzoxyglycine, 1.93 parts by weight of DL-phenylalanine ethyl ester and 2.6 parts by weight of tetraethylpyrophosphite are mixed and heated on a steam bath for 30 minutes. The reaction mixture is washed with water and filtered to remove the precipitate of carbobenzoxyglycyl-DL-phenylalanine ethyl ester.

Part B.—The procedure of Part A is repeated except that the carbobenzoxyglycyl-DL-phenylalanine ethyl ester and tetraethylpyrophosphite are mixed together and heated to 90° C. before the addition of the DL-phenylalanine ethyl ester. The yield of carbobenzoxyglycyl-DL-phenylalanine ethyl ester is somewhat higher.

Part C.—The procedure of Part A is repeated except that the DL-phenylalanine ethyl ester and the tetraethylpyrophosphite are mixed together and heated to 90° C. before the addition of the carbobenzoxyglycine. Again the yield of carbobenzoxyglycyl-DL-phenylalanine ethyl ester is somewhat higher.

EXAMPLE XII

Carbobenzoxyglycyl-DL-phenylalanine ethyl ester

In 6.9 parts by weight of diethylphosphite there is dissolved 2.3 parts by weight of phenylalanine ethyl ester hydrochloride by warming and to this mixture there is added 2.1 parts of carbobenzoxyglycine and 3.88 parts by weight of tetraethylpyrophosphite. The resulting mixture is heated on a steam bath for 19 minutes and then diluted with 15 parts by volume of water. The resulting precipitate is removed by filtration and washed with 5 parts by volume of water, 10 parts by volume of half saturated sodium bicarbonate solution, and 10 parts by volume of water. Carbobenzoxyglycyl-DL-phenylalanine ethyl ester is obtained in excellent yield.

EXAMPLE XIII

Carbobenzoxy-L-leucylglycine ethyl ester

To 6.9 parts by weight of diethylphosphite there is added 2.65 parts of carbobenzoxy-L-leucine, 1.4 parts of glycine ethyl ester hydrochloride, and 5.2 parts of tetraethylpyrophosphite. This mixture is heated on a steam bath for 15 minutes and then diluted with 25 parts by volume of water. The resulting precipitate is removed by filtration and washed with 5 parts by volume of water, 5 parts by volume of half saturated sodium bicarbonate solution and twice with 5 parts by volume of water. This carbobenzoxy-L-leucylglycine ethyl ester is purified by two recrystallizations from 50% alcohol.

EXAMPLE XIV

Phthalylglycyl-L-leucine ethyl ester

To 6.9 parts by weight of diethylphosphite there is added 1.96 parts by weight of L-leucine ethyl ester hydrochloride followed by 1.1 parts by weight of triethylamine. The resulting precipitate of triethylamine hydrochloride is removed by filtration. To the clear solution there is added 2.05 parts of phthalylglycine and this mixture heated to 90° C. on a steam bath. To the hot reaction mixture there is added 5.16 parts of tetraethylpyrophosphite and the heating continued for 15 minutes. The reaction mixture is diluted with 30 parts by volume of water and chilled and the resulting precipitate removed by filtration. The precipitate is washed with 5 parts by volume of water, 10 parts by volume of half saturated sodium bicarbonate solution, and two 5 parts by volume portions of water. This phthalylglycyl-L-leucine ethyl ester is then purified by recrystallization from approximately 40 parts by volume of 50% alcohol.

EXAMPLE XV

Carbobenzoxy-L-leucyl-L-leucine methyl ester

A mixture of 2.65 parts by weight of carbobenzoxy-L-leucine, 1.45 parts by weight of L-leucine methyl ester, 2.8 parts by weight of tetraethylpyrophosphite and 10 parts by volume of diethylphosphite are heated on a steam bath for 30 minutes. The hot reaction mixture is diluted with 15 parts by volume of water and the resulting solid precipitate removed by filtration. This carbobenzoxy-L-leucyl-L-leucine methyl ester is then washed with sodium bicarbonate solution and water and purified by recrystallization from ether.

EXAMPLE XVI

Carbobenzoxy-L-leucyl-L-tyrosine ethyl ester

To 10 parts by volume of diethylphosphite there is added 2.65 parts of carbobenzoxy-L-leucine, 2.1 parts of L-tyrosine, and 2.8 parts of tetraethylpyrophosphite and the mixture heated on a steam bath for 30 minutes. The resulting oil is cooled and washed with water. It is then taken up in ether and this solution precipitated with petroleum ether. The resulting precipitate of carbobenzoxy-L-leucyl-L-tyrosine ethyl ester is purified by crystallization from ethyl acetate-petroleum ether.

EXAMPLE XVII

*Phthalylglycyl L-tyrosine ethyl ester*

In 10 parts by volume of diethylphosphite there is dissolved 2.05 parts by weight of phthalylglycine and 2.1 parts of L-tyrosine ethyl ester. This mixture is heated on a steam bath and to the hot mixture is added 2.58 parts of tetraethylpyrophosphite, after which heating is continued for an additional 30 minutes. The resulting oil is washed with water, sodium bicarbonate solution and water to obtain a waxy solid. This is purified by 3 crystallizations from ethyl acetate-petroleum ether.

I claim:

1. A method of forming an amide linkage which comprises reacting together a compound containing an amide-forming carboxyl group, a compound containing an amino group capable of being acylated, and a tetraalkylpyrophosphite capable of being represented by the formula:

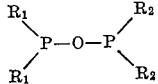

wherein $R_1$ and $R_2$ represent alkyl groups having less than 4 carbon atoms.

2. A method according to claim 1 wherein the tetraalkylpyrophosphite is tetraethylpyrophosphite.

3. The method of claim 1 wherein said compound containing an amide forming carboxyl group is first reacted with said tetraalkylpyrophosphite and this reaction product then reacted with said compound containing an amino group capable of being acylated.

4. The method of claim 1 wherein said compound containing an amino group capable of being acylated is first reacted with said tetraalkylpyrophosphite and this reaction product then reacted with said compound containing an amide forming carboxylic group.

5. A method of forming an amide linkage which comprises reacting a tetraalkylpyrophosphite represented by the formula:

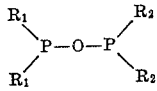

wherein $R_1$ and $R_2$ in each instance represent alkyl radicals having less than 4 carbon atoms, with a mixture formed from a compound having an amide forming carboxylic group and a compound having an amino group capable of being acylated.

6. The method of claim 5 wherein said tetraalkylpyrophosphite is tetraethylpyrophosphite.

7. The method which comprises reacting together an N-acylated aminoacid, a lower alkyl ester of an aminoacid and a tetraalkylpyrophosphite represented by the formula:

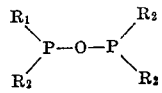

wherein $R_1$ and $R_2$ in each instance represent alkyl radicals having less than 4 carbon atoms.

8. The method which comprises reacting together an N-acylated aminoacid, a lower alkyl ester of a peptide acid having an amino group capable of being acylated and a tetraalkylpyrophosphite represented by the formula:

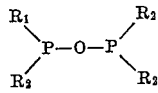

wherein $R_1$ and $R_2$ in each instance represent alkyl radicals having less than 4 carbon atoms.

9. A method of preparing carbobenzoxyglycyl-DL-phenylalanine ethyl ester which comprises reacting together tetraethylpyrophosphite, DL-phenylalanine ethyl ester, and carbobenzoxyglycine.

10. A method of preparing carbobenzoxy-L-leucylglycine ethyl ester which comprises reacting together tetraethylpyrophosphite, carbobenzoxy-L-leucine, and glycine ethyl ester.

11. A method of preparing carbobenzoxy-L-leucyl-L-leucine methyl ester which comprises reacting together tetraethylpyrophosphite, carbobenzoxy-L-leucine and L-leucine methyl ester.

12. A method of preparing carbobenzoxy-L-leucyl-L-tyrosine ethyl ester which comprises reacting together tetraethylpyrophosphite, carbobenzoxy-L-leucine and L-tyrosine ethyl ester.

13. A method of preparing carbobenzoxy-L-tyrosylglycylglycine ethyl ester which comprises reacting together tetraethylpyrophosphite, glycylglycine ethyl ester and carbobenzoxy-L-tyrosine.

No references cited.